United States Patent
Fetibegovic

(10) Patent No.: US 11,035,431 B2
(45) Date of Patent: Jun. 15, 2021

(54) GAS SPRING AND SAFETY METHOD FOR GAS SPRING

(71) Applicant: Stromsholmen AB, Tranas (SE)

(72) Inventor: Avdulah Fetibegovic, Tranas (SE)

(73) Assignee: Stromsholmen AB, Tranas (SE)

( * ) Notice: Subject to any disclaimer, the term of this patent is extended or adjusted under 35 U.S.C. 154(b) by 0 days.

(21) Appl. No.: 15/308,465

(22) PCT Filed: Jun. 12, 2015

(86) PCT No.: PCT/EP2015/063156
§ 371 (c)(1),
(2) Date: Nov. 2, 2016

(87) PCT Pub. No.: WO2015/193187
PCT Pub. Date: Dec. 23, 2015

(65) Prior Publication Data
US 2017/0051807 A1    Feb. 23, 2017

(30) Foreign Application Priority Data
Jun. 19, 2014 (SE) .................................... 1450765-1

(51) Int. Cl.
*F16F 9/02* (2006.01)
*F16F 9/00* (2006.01)

(52) U.S. Cl.
CPC .......... *F16F 9/0281* (2013.01); *F16F 9/0218* (2013.01); *F16F 2222/126* (2013.01); *F16F 2230/0023* (2013.01)

(58) Field of Classification Search
CPC .. F16F 9/0281; F16F 9/0218; F16F 2222/126; F16F 2230/0023
See application file for complete search history.

(56) References Cited

U.S. PATENT DOCUMENTS 5,098,071 A * 3/1992 Umetsu .................... F16F 9/088
188/322.17
5,344,125 A * 9/1994 Cotter ..................... F16F 9/0218
267/119

(Continued)

FOREIGN PATENT DOCUMENTS

CN    101082359    12/2007
CN    103291684     9/2013

(Continued)

OTHER PUBLICATIONS https://www.engineeringtoolbox.com/young-modulus-d_417.html (Year: 2020).*

(Continued)

*Primary Examiner* — Melody M Burch
(74) *Attorney, Agent, or Firm* — Ulmer & Berne LLP; Brian Turung; Eric Robbins

(57) ABSTRACT

A gas spring consisting of a gas cylinder (2), a piston rod (3) which is movable in the axial direction in the gas cylinder (2), a guide (4), wherein an axially outwardly open gap (6) exists between the guide (4) and the gas cylinder. A protection (10) is arranged so that it extends radially over the width of the gap (6). The protection (10) is fixed in the guide (4) or in the cylinder wall (5). The protection is configured so that, when an axial force (F) is applied to the protection, a first part of the force (F) is transmitted to the guide (4) and a second part of the force to the cylinder wall (5), and thus the protection (10) relieves the load on the guide (4).

22 Claims, 5 Drawing Sheets

(56) References Cited

U.S. PATENT DOCUMENTS

| | | | | |
|---|---|---|---|---|
| 5,465,819 A | * | 11/1995 | Weilant | B60K 17/20 192/35 |
| 6,212,989 B1 | * | 4/2001 | Beyer | F41H 5/263 102/201 |
| 6,431,332 B1 | * | 8/2002 | Phelizot | F16F 9/0218 188/286 |
| 6,796,159 B2 | * | 9/2004 | Keim | B21D 24/02 72/351 |
| 2008/0018028 A1 | * | 1/2008 | Kamioka | B62K 25/283 267/64.23 |
| 2008/0314706 A1 | * | 12/2008 | Lun | F16F 9/067 188/267.2 |
| 2009/0145707 A1 | * | 6/2009 | Henneberg | B60G 13/00 188/322.12 |
| 2010/0044937 A1 | * | 2/2010 | Lee | B60G 15/10 267/113 |
| 2011/0303084 A1 | | 12/2011 | Cappellar | |
| 2012/0042770 A1 | * | 2/2012 | Cappeller | B21D 24/02 91/41 |
| 2013/0306290 A1 | * | 11/2013 | MacKelvie | F28F 21/085 165/181 |

FOREIGN PATENT DOCUMENTS

| | | |
|---|---|---|
| EP | 0959263 | 11/1999 |
| EP | 1808562 | 8/2007 |
| EP | 2177783 | 4/2010 |
| WO | 2010102994 | 9/2010 |
| WO | 2013160494 | 10/2013 |

OTHER PUBLICATIONS

European Patent Office; International Search Report and Written Opinion for related application No. PCT/EP2015/063156 (dated Sep. 18, 2015).

* cited by examiner

GAS SPRING AND SAFETY METHOD FOR GAS SPRING

TECHNICAL FIELD

The present invention relates to a gas spring and a safety method for a gas spring.

BACKGROUND

In the pressing of sheet metal parts, gas springs are used during the forming process partly to hold the sheet during the forming process and partly to separate the mold halves after the sheet forming. Gas springs which support the blank holder are loaded at the start of the pressing process and unloaded upon upward movement of the press slide and press top part after completed sheet forming. How large a part of the gas spring is loaded is controlled by the pressing process, the look of the final-pressed sheet part and the utilized stroke length. For optimization of the sheet forming operation, full control over the pressing cycle is required.

There is a risk that the pressing cycle cannot be satisfactorily controlled. In the event of overload, the gas springs can be adversely affected in case of a stroke which has run through too far and is longer than the defined nominal stroke length of the gas spring. This overload causes damage to the tube of the gas spring, which leads to reduced working life and to the tube possibly falling apart in an uncontrolled and undesirable manner. In order to avoid this, gas springs have been equipped with protection against overstroke, which means that the gas can leak out safely should the gas spring be subjected to a stroke exceeding its nominal stroke length. Examples of such protections can be seen in EP 1366308 B1, EP 0959263 B1, EP 2177783 A2 and WO 2010/102994 A1.

In the above-illustrated solutions for overstroke protection, situations can arise in which the protection triggers when it should not. One of these situations can be when the gas springs are connected in the pressing tool by hose coupling. When the gas in the spring is emptied in the course of, for example, servicing, the gas spring is made pressureless and the ability of the gas spring to support the blank holder vanishes. Due to the weight of the blank holder, the piston rod of the gas spring is then pushed inward in the spring and, when it reaches its end position, the weight of the blank holder can cause the overstroke protection to trigger: either as in EP 2177783 A2 and WO 2010/102994 A1, in which the guide is pushed into the tube, or as in EP 0959263 B1, in which the piston rod can push out the plug placed in the bottom part of the gas spring.

SUMMARY

An object is therefore to provide a gas spring having a reduced risk of unnecessary triggering of the overstroke protection.

The invention is defined by the appended independent patent claims. Embodiments emerge from the dependent patent claims, from the following description and from the appended drawings.

According to a first aspect, a gas spring, comprising a gas cylinder, a piston rod which is movable in the axial direction in the gas cylinder, and a guide, wherein an axially outwardly open gap exists between a cylinder wall and the guide, is provided. The gas spring further comprises a protection, which is arranged so that it extends radially over the width of the gap. The dirt protection is fixed in the guide or in the cylinder wall and configured so that, when an axial force is applied to the protection, a first part of the force is transmitted to the guide and a second part of the force to the cylinder wall.

The axially outwardly open gap can run in the peripheral direction between the guide and the cylinder wall.

When an axially compressing force is applied to the gas spring, a part of the force is transmitted to the protection when the gas spring approaches overstroke viewed in the direction of compression, and that part of the force which strikes the protection is transmitted to the guide and the cylinder wall, such that the protection relieves the load on the guide. The protection thus delays triggering of the overstroke protection of the gas spring and reduces the risk of unnecessary triggering.

The protection can be provided with a circumferential flange, which has an extent in the axial and the radial direction.

The protection can be fixed, with the aid of the flange, in a radial recess in the guide.

The protection can be fixed, with the aid of the flange, in a radial recess in the inner wall surface of the gas cylinder.

The flange effects an at least substantially positive fixing of the protection relative to the guide and/or the cylinder wall. In addition, the flange can transmit an axially acting force to/from the part in which it is fixed. The flange can be divided, viewed in the peripheral direction of the protection, into at least 2, at least 5, at least 10, or at least 20 separated circular segments, with a flange-free spacing in the peripheral direction of the protection therebetween.

Division of the flange into circular segments with a flange-free spacing therebetween increases the flexibility of the flange in the radial direction and thereby facilitates mounting of the protection on the gas spring. In addition, through the choice of material and through the distribution and configuration of the flange-free spacings, the axial rigidity of the protection can be affected. The flange-free spacing between the circular segments for the gas also makes it easier for the gas to leak out in the event of a overstroke.

The expanse of the circular segment in the peripheral direction of the protection can be at least as large as, at least 1.5 times larger, at least 2 times larger, or at least 3 times larger than the flange-free spacing in the peripheral direction of the protection between two separated circular segments.

The expanse of a circular segment in the peripheral direction of the protection can be at least ⅓ of, at least ½ of, at least ⅔ of, or equally as large as the flange-free spacing in the peripheral direction of the protection between two separated circular segments.

The protection can comprise a guide contact portion, which effects sealing against the guide, and a cylinder contact portion, which effects sealing against the cylinder wall.

One of the guide contact portion and the cylinder contact portion can be pretensioned against the guide and the cylinder wall respectively.

The pretensioning can be in the axial direction and/or the radial direction.

The protection can further comprise a radial connecting part, which radially connects the guide contact portion and the cylinder contact portion.

The radial extent of the radial connecting part can be larger than the width of the gap.

At least one of the guide contact portion and the cylinder contact portion can have fixing members for positive fixing of the protection relative to the guide and the cylinder wall respectively.

An alternative to positive fixing can be frictional fixing.

The protection can have a spacer surface, which bears against a ramp surface of the end face of the gas cylinder in the axial direction or against a ramp surface on the guide.

The spacer surface can be formed on a portion running around the protection.

The ramp surface can constitute a chamfering of the transition of the axial end face to an outer wall surface of the gas cylinder.

The spacer surface can be configured in a radially outer part of the cylinder contact portion.

The ramp surface can alternatively constitute a chamfering of the axial end face of the guide at the transition to an inner, piston-rod-facing wall surface of the guide.

The spacer surface can alternatively be configured in a radially outer part of the guide contact portion.

The spacer surface and/or the ramp surface can be substantially conical or curved/rounded, for instance so that, when the protection is subjected to an axially compressing force, the spacer surface will be displaced radially outward in interaction with the ramp surface, wherein the material portion in which the spacer surface is formed is elastically stretched in the peripheral direction. This produces a peripherally acting compressing force, which, when the axially compressing force ceases to act, will cause the protection to return to its original position. The protection is thus guided out over the end face of the gas cylinder or the guide in the radial direction, and reduces the risk of bending of the protection when this is subjected to axial force. The spacer surface which bears against the ramp surface of the end face of the gas cylinder in the axial direction, or against the ramp surface on the guide, also absorbs a part of the axially compressing force.

The gas spring can further comprise a safety device which is configured to evacuate excess pressure from the gas cylinder in the event of a overstroke, and wherein the protection extends axially further out than a safety stroke of the gas spring, so that the protection transmits the axial force applied to the protection to the guide and the cylinder wall before the safety device is activated.

The safety device can be of the type of overstroke protection which is shown, for example, in EP 2177783 A2 and WO 2010/102994 A1, or of the type which is shown in EP 0959263 B1.

The protection does not however prevent the overstroke protection from being activated if overstroke occurs, but only prevents such activation occurring unnecessarily.

The protection can be configured and arranged so that it produces an axially expanding force between the guide and the cylinder wall once the axial force applied to the protection has been removed.

The protection thus helps to spring back the guide into a starting position once the axial force applied to the protection has been removed.

Specifically, the protection can be configured and arranged to produce an axial force which is sufficiently large to restore the axial position of the guide from a position in which the safety device has not been activated to such an extent that gas has started to leak out.

The protection can be formed in a material having an E-modulus which is at least $1/100$ to $1/5$ of, at least $1/50$ to $1/5$ of, at least $1/25$ to $1/5$ of, or at least $1/10$ to $1/5$ of the E-moduli for the materials in which the guide and the gas cylinder are formed.

The material in the protection can be a polymer material which is chosen from a group consisting of plastic, rubber and rubbery materials. Examples of such materials are TPE, TPU and PU.

The protection can be arranged to transmit an axial force, applied to the protection, of 1000-50000 N, 2500-50000 N, 5000-50000 N, 10000-50000 N, 20000-50000 N, 30000-50000 N or 40000-50000 N to the guide and the cylinder wall.

The protection can be a dirt protection which seals between the guide and the gas cylinder, so that dirt is prevented from forcing its way down in the gap and into the gas spring.

The protection can, but does not have to be, integrated with a dirt protection.

The protection can be configured and arranged so that it prevents the guide from slipping into the gas cylinder when the gas spring is made pressureless.

According to a second aspect, a safety method for a gas spring comprising a gas cylinder, a piston rod which is movable in the axial direction in the gas cylinder, a guide, wherein an axially outwardly open gap exists between a cylinder wall and the guide, a protection, which is fixed in the guide or in the cylinder wall and arranged so that it extends radially over the width of the circumferential gap, is provided, wherein the safety method comprises:
  applying a compressing axial force to the gas spring,
  when the gas spring approaches overstroke viewed in the direction of compression, transmitting a part of the compressing axial force to the protection,
  transmitting that part of the compressing axial force which strikes the protection to the guide and the cylinder wall.

The safety method can comprise further steps of:
  producing, by means of the protection, an expanding force in the direction opposite to the direction of compression between the guide and the cylinder wall, and
  returning the guide to a starting position once the compressing axial force has been removed.

In this way, the protection therefore helps to spring back the guide into its starting position when the axial force is removed.

DESCRIPTION OF EMBODIMENTS

Figure 1:
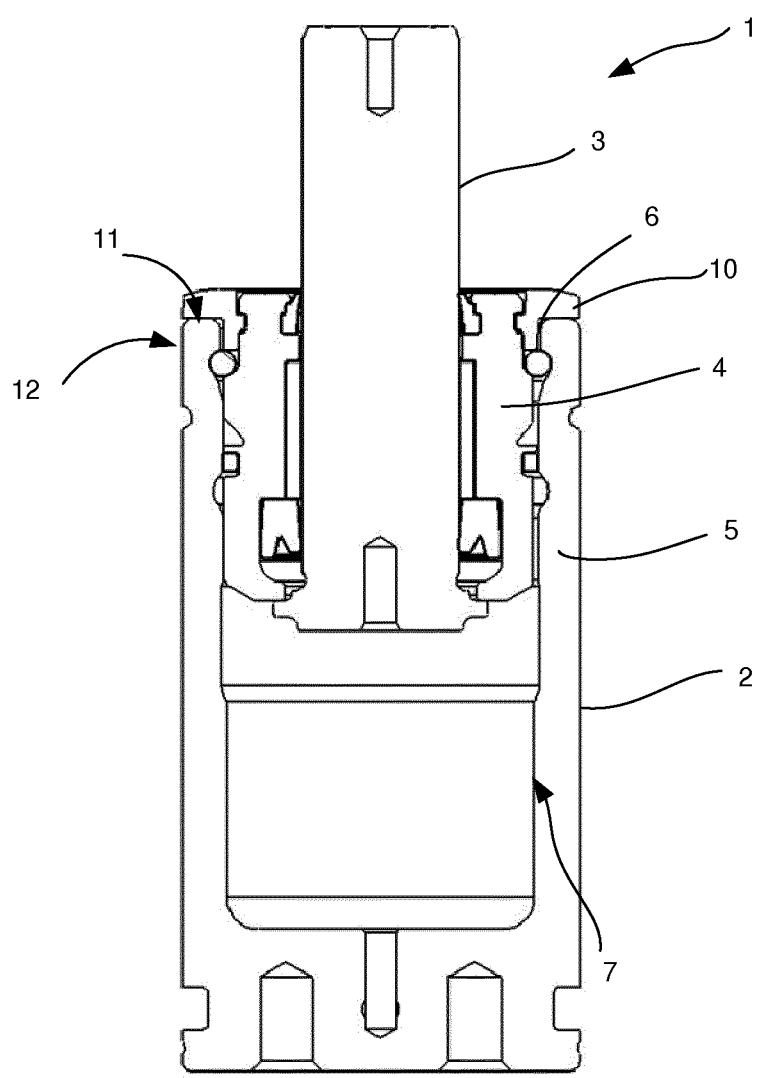
FIG. 1 is a cross section of a gas spring provided with protection.

Gas springs are equipped with protection against overstroke in order to reduce damage to the tube of the gas spring due to overload. The overstroke protection is designed so that the gas in the spring can leak out safely should the gas spring be subjected to a stroke exceeding the nominal stroke length of the gas spring. Various types of overstroke protection are found: either as in EP 2177783 A2 and WO 2010/102994 A1, in which the guide which projects beyond the tube edge of the gas cylinder is pushed into the tube, see FIGS. 4a-4c, or as in EP 0959263 B1, in which the piston rod can push out a plug placed in the bottom part of the gas spring. In the last-named case, the guide does not necessarily stick up out of the gas cylinder.

The embodiments of the invention which are discussed below for providing a gas spring having reduced risk of unnecessary triggering of the overstroke protection apply to both the abovementioned types of overstroke protection. In the application and in the figures however, for the sake of simplicity, only the first-named type is shown, but the solution which is discussed below provides the same effect regardless of the overstroke protection with which the gas spring is provided.

A gas spring according to the invention, having reduced risk of unnecessary triggering of the overstroke protection, see FIG. 1, FIG. 3 and FIGS. 4a-4c, consists of a gas cylinder 2, a piston rod 3 which is movable in the axial direction in the gas cylinder 2, a guide 4, an axially outwardly open gap 6 situated between the guide 4 and the gas cylinder 2. A protection 10 is arranged so that it extends radially over the width of the gap 6. The protection 10 is fixed in the guide 4 or in the cylinder wall 5. The protection is configured so that, when an axial force F is applied to the protection, a first part of the force F is transmitted to the guide 4 and a second part of the force to the cylinder wall 5.

The protection 10 distributes the thereto applied force F to the guide 4 and the cylinder wall 5, such that the protection 10 relieves the load on the guide 4. With the unloading of the guide 4, the activation of the overstroke protection of the gas spring 1 is delayed, whereby the risk of unnecessary triggering of the overstroke protection is reduced. The protection 10 also prevents the guide 4 from slipping into the gas cylinder 2 when the spring is made pressureless.

The distribution of the force applied to the protection 10, which force is transmitted to the guide 4 or the cylinder wall 5, can be 50-50, 40-60, 60-40, 30-70, 70-30, 20-80, 80-20, 10-90 or 90-10.

The axially outwardly open gap 6 can be a gap which runs in the peripheral direction between the guide 4 and the cylinder wall 5. The gap 6 facilitates mounting of the gas spring 1.

The protection 10 can be a dirt protection which seals between the guide 4 and the gas cylinder 2, so that dirt is prevented from forcing its way down in the gap 6 and into the gas spring 1.

Figure 4C:
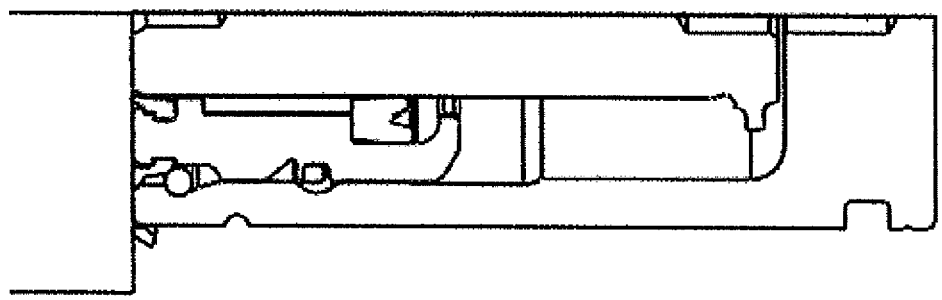
FIGS. 4*a*-4*c* are partial sections of a gas spring provided with protection and in which the process is shown for triggering of the overstroke protection of the gas spring.
Figure 4B:
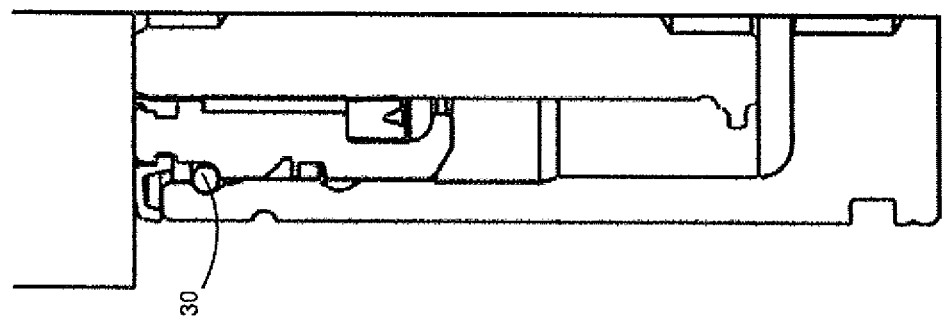
Figure 4A:
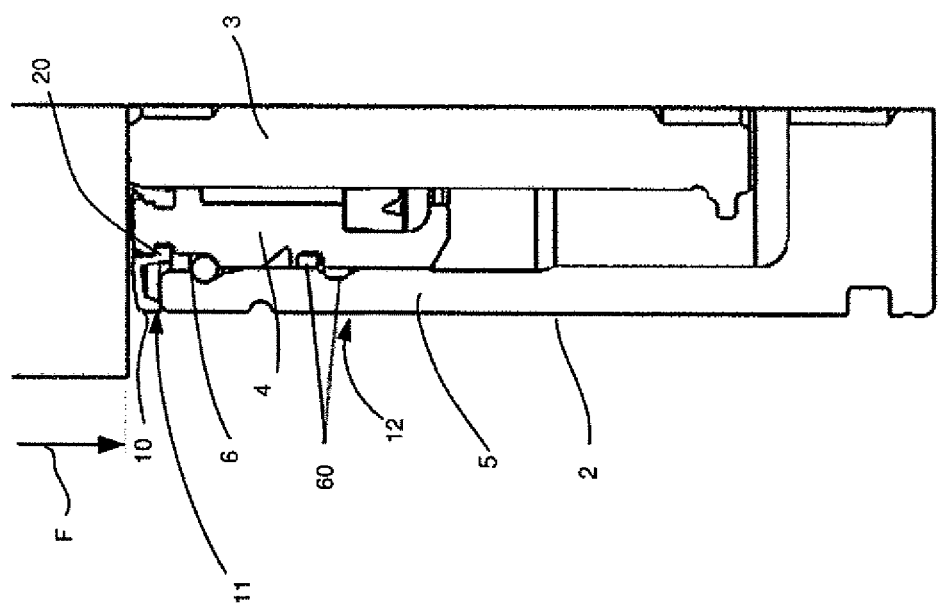

The protection 10 can seal by bearing against or being pretensioned against an end face 11 in the axial direction of the gas cylinder 2, see FIGS. 4a-4c, and alternatively also bearing against or being pretensioned against the outer wall 12 of the gas cylinder 2 if the protection 10 is configured to extend, in the radial direction past the end face 11 of the gas cylinder 2 (not shown). The protection 10 can optionally also bear against or be pretensioned against the inner wall 7 (not shown) of the gas cylinder 1.

The protection 10 can seal by bearing against an end face in the axial direction of the guide 4 and/or bearing against the outer wall of the guide 4 (not shown).

The protection 10 (FIGS. 2a, 2b, 2c) can be provided with a circumferential flange 20, which has an extent in the axial and the radial direction. The protection 10 can be fixed in a radial recess in the guide 4 by the flange 20 (see FIGS. 4a-4c). Alternatively, the protection 10 can be fixed in a radial recess in the inner wall surface 7 of the gas cylinder by the flange 20 (not shown). The axial extent of the flange 20 of the protection 10 can be adapted so that the protection 10 is detained in a radial recess in the guide 4 or in the inner wall surface 7 of the gas cylinder.

The flange 20 can be divided, viewed in the peripheral direction of the protection, into at least 2, at least 5, at least 10 or at least 20 separated circular segments 21, with a flange-free spacing in the peripheral direction of the protection 10 therebetween.

The expanse of the circular segment 21 in the peripheral direction of the protection 10 can be at least as large as, at least 1.5 times larger, at least 2 times larger, or at least 3 times larger than the flange-free spacing in the peripheral direction of the protection 10 between two separated circular segments 21. The expanse of a circular segment 21 in the peripheral direction of the protection 10 can be at least ⅓ of, at least ½ of, at least ⅔ of, or equally as large as the flange-free spacing in the peripheral direction of the protection 10 between two separated circular segments 21.

Figure 6:
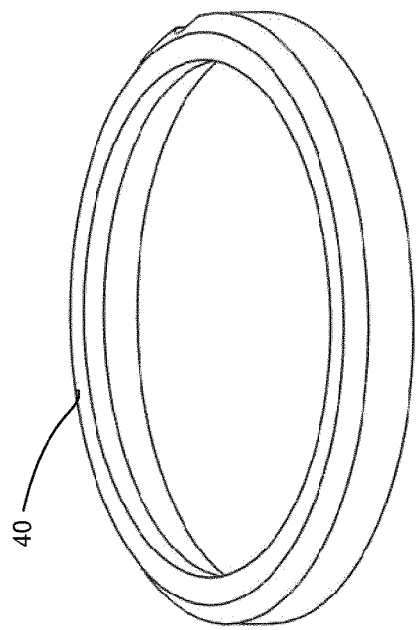
FIG. 6 shows a perspective view of the dirt protection in FIG. 5.
Figure 5:
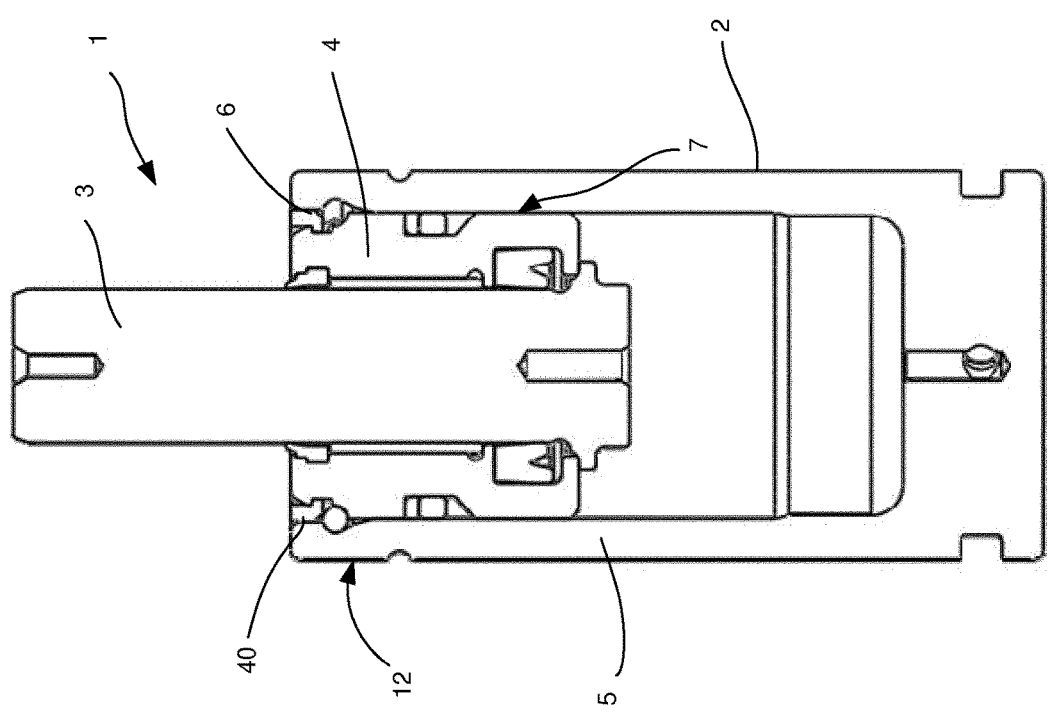
FIG. 5 shows a cross section of a gas spring having a known type of dirt protection.

FIG. 5 shows a gas spring 1 having a known type of dirt protection 40 (FIG. 6). This dirt protection 40, unlike the particular protection 10, is merely configured to prevent dirt from entering the gas spring 1, and no, or very little (and then only frictional), unloading of the guide 4 occurs. Just like the particular protection 10, the known type of dirt protection 40 prevents the guide 4 from slipping into the gas cylinder 2 when the gas spring 1 is made pressureless.

The particular protection 10 can be formed in a material having an E-modulus which is at least 1/100 to ⅕ of, at least 1/50 to ⅕ of, at least 1/25 to ⅕ of, or at least 1/10 to ⅕ of the E-moduli for the material in which the guide 4 and the gas cylinder 2 are formed.

Preferably, at least 50%, at least 75%, or 100% of the dirt protection is formed in such a material.

The material in the protection 10 can be a polymer material which is chosen from a group consisting of plastic, rubber and rubbery materials. Such materials can be, for example, PU, TPE or TPU. The protection can be formed of a material having a hardness of 30-100 Shore A, preferably 70-100 Shore A or 80-90 Shore A.

Figure 2A:
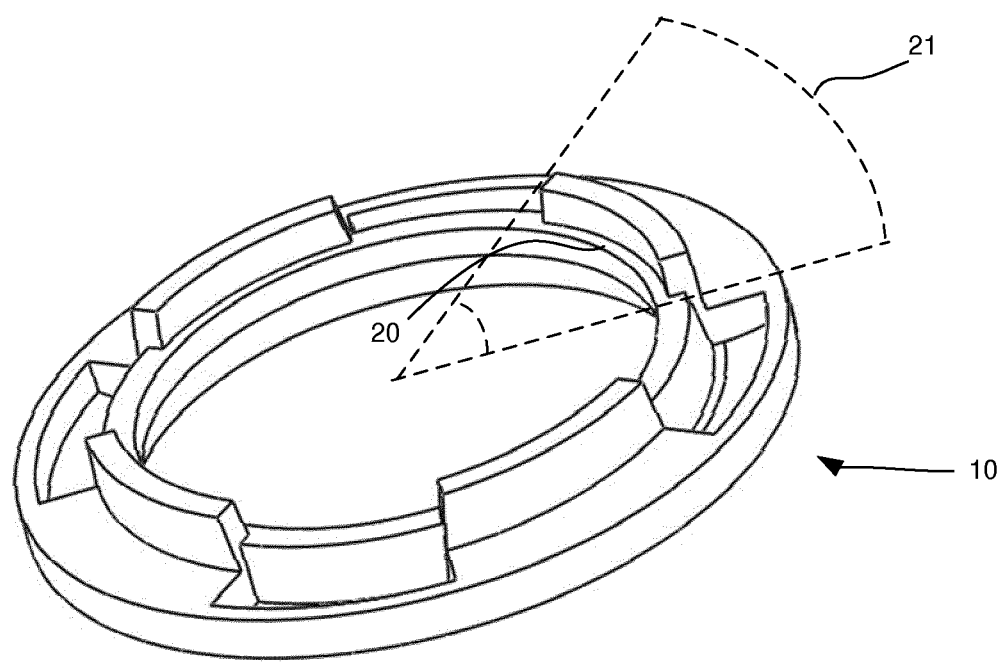
FIG. 2*a* shows a perspective view of a protection.
Figure 2B:
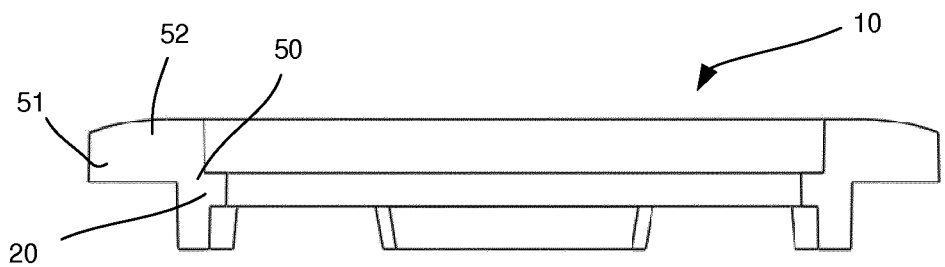
FIG. 2*b* shows a cross section of a protection.
Figure 2C:
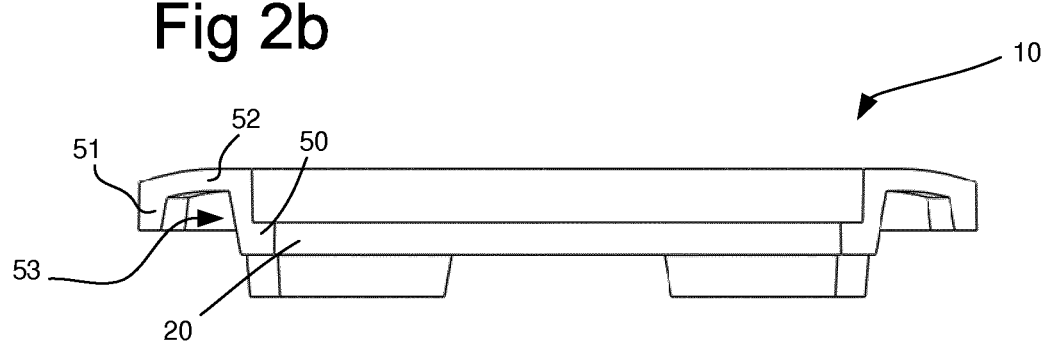
FIG. 2*c* shows a cross section of a dirt protection.
Figure 3:
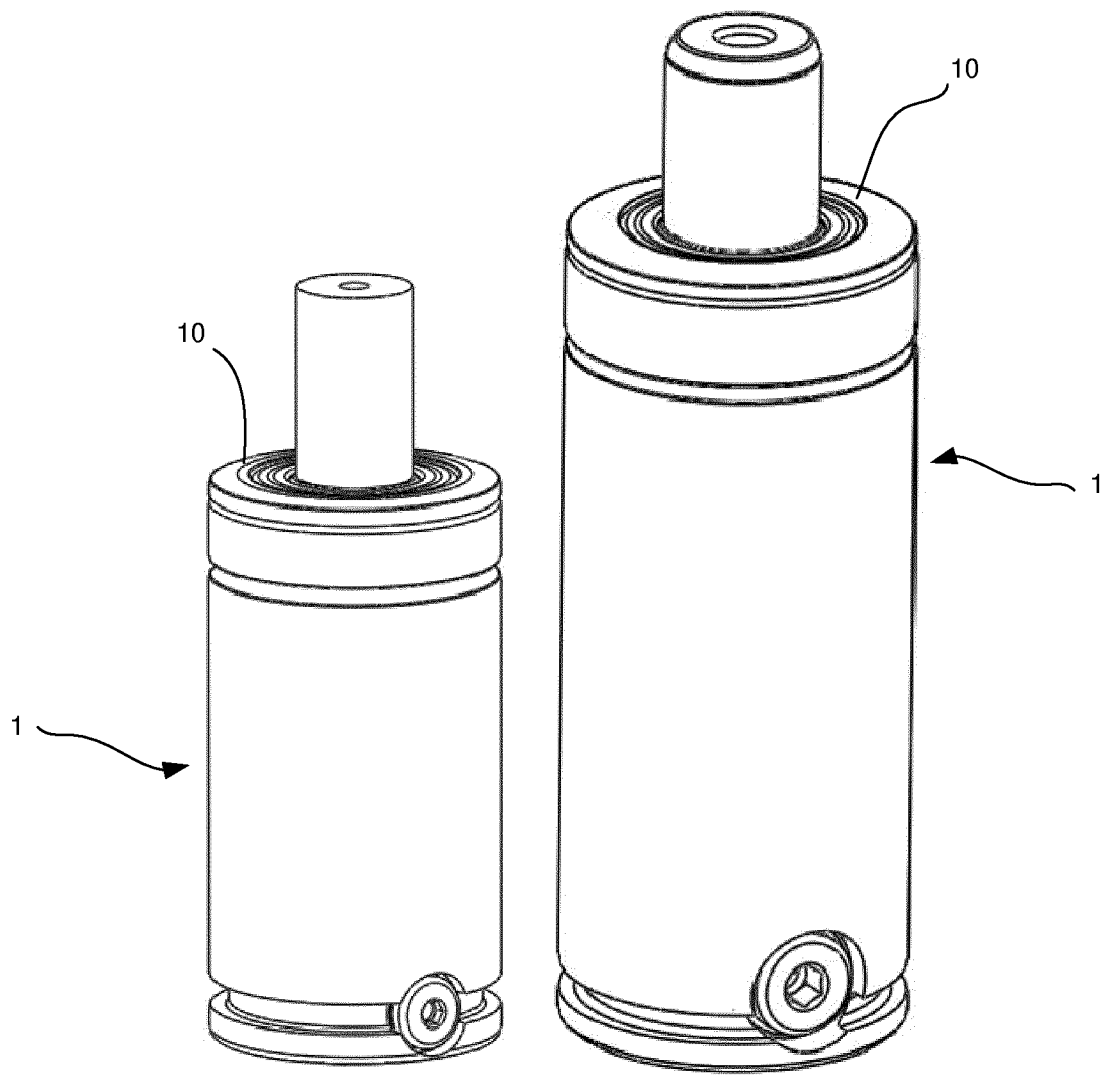
FIG. 3 is a perspective view of a complete gas spring with protection.

The protection 10, FIGS. 2a-2c, can comprise a guide contact portion 50, which effects sealing against the guide 4, and a cylinder contact portion 51, which effects sealing against the cylinder wall 5.

The protection 10 can further comprise a radial connecting part 52, which radially connects the guide contact portion 50 and the cylinder contact portion 51.

The radial extent of the radial connecting part 52 can be larger than the width of the gap 6.

At least one of the guide contact portion 50 and the cylinder contact portion 51 can have fixing members 20 for positive fixing of the protection 10 relative to the guide 4 or the respective cylinder wall 5.

One or both of the guide contact portion 50 and the cylinder contact portion 51 can be pretensioned against the guide 4 and the cylinder wall 5 respectively.

The pretensioning can be in the axial direction and/or the radial direction.

An alternative to fixing members for positive fixing is for at least one of the guide contact portion and the cylinder contact portion to have fixing members for frictional fixing.

For the protection 10 which is shown in FIG. 2b, here mounted on a gas spring 1, the radial connecting part 52 bears against the end face 11 of the gas cylinder in the axial direction. The connecting part 52 in the protection 10 in FIG. 2c does not bear against the end face of the gas cylinder in the axial direction 11 (see FIG. 1), whereupon a circumferential or partially circumferential covered channel 53 is formed when the protection 10 in FIG. 2c sits mounted on the gas spring 2 and is free from load.

The protection 10 can have a spacer surface, which bears against a ramp surface of the end face 11 of the gas cylinder in the axial direction or against a ramp surface on the guide 4.

The ramp surface can constitute a chamfering of the transition of the axial end face 11 to an outer wall surface 12 of the gas cylinder 2.

The spacer surface can be configured in a radially outer part of the cylinder contact portion 51.

The ramp surface can alternatively constitute a chamfering of the axial end face of the guide at the transition to the inner, piston-rod-facing wall surface of the guide.

The spacer surface can alternatively be configured in a radially outer part of the guide contact portion 52.

The protection 10 is thus guided out over the end face 11 of the gas cylinder or the guide 4 in the radial direction, and reduces the risk of bending of the protection 10 when this is subjected to axial force F.

The spacer surface can be formed on a portion running around the protection 10.

The gas spring 1 can further comprise a safety device which is configured to evacuate excess pressure from the gas cylinder 2 in the event of a overstroke, and wherein the protection 10 extends axially further out than a safety stroke of the gas spring 1, so that the protection 10 transmits the axial force F applied to the protection to the guide 4 and the cylinder wall 5 before the safety device 60 is activated.

The safety stroke can be defined as that part of the stroke of the piston rod 3 during which some safety device (in the top or bottom of the cylinder 2) is activated. The safety stroke can include that some part moves with the piston rod 3, such as is the case with the protruding guide 4 which is shown in, for example, FIG. 1.

Preferably, the protection can be activated prior to the commencement of the safety stroke. The stroke of the protection can here constitute 100%-300% of the safety stroke, preferably 150%-200%.

The safety device can be of the type which is shown, for example, in EP 2177783 A2 and WO 2010/102994 A1, or of the type which is shown in EP 0959263 B1.

In FIGS. 4a-4c are shown partial sections of a gas spring 1 provided with a protection 10. In these figures is shown the process for triggering a overstroke protection of the type which is shown in EP 2177783 A2 and WO 2010/102994 A1 of the gas spring 10 provided with the particular protection 10. In FIG. 4a, the protection 10 is seen fixed in a recess in the guide 4. The protection 10 extends radially over the axially open gap 6. When an axial force F is applied to the protection 10, FIG. 4b, the protection 10 is compressed in the axial direction and transmits a part of the force F to the guide 4 and a part of the force to the cylinder wall 5 and/or the axial end face 11 of the gas cylinder 2, whereupon the guide is relieved of load. In FIG. 4c, the force which is transmitted to the guide has become so large that the guide 4 has been pushed into the gas cylinder and a static seal 30 (O-ring) between the gas cylinder 2 and the guide 4 has passed a groove inside the tube, wherein the overstroke protection has been triggered and gas has leaked out in a controlled manner.

When the gas spring 1 is made pressureless, no greater force is consumed in order that the guide 4 shall be pushed down in the gas cylinder 2 and end up in a position in which the gas can pass, which can result in the spring 2 not being able to be refilled after servicing.

The configuration of the protection 10 is such that, if a overstroke occurs, the protection 10 does not prevent the gas spring 1 from activating its overstroke protection, but ensures that this is not unnecessarily triggered. The protection 10 can be configured so that it can produce an expanding force on the guide 4. The fixing of the protection 10 relative to the guide 4 must thus be such that it can absorb a sufficiently large force in the direction opposite to the direction of compression, i.e. the direction of expansion. Moreover, a counterforce must be able to be produced by that part of the protection 10 which bears against the cylinder wall 5 and be able to be transmitted by the part which interconnects the radially inner and outer parts of the protection 10. The protection 10 therefore helps to spring back the guide 4 into its starting position when the axial force F is removed.

The protection 10 can cope with large loads before the guide 4 is pushed down. The protection can be arranged to transmit an axial force, applied to the protection, of 1000-50000 N, 2500-50000 N, 5000-50000 N, 10000-50000 N, 20000-50000 N, 30000-50000 N or 40000-50000 N to the guide and the cylinder wall.

When the load on the gas spring 1 decreases, for example when gas is replenished in the spring 1, the protection 10 helps to ensure that the guide 4 does not resume its normal position.

In the same way, the protection 10 can be used in the solution for overstroke protection in EP 0959263 B1, in which the piston rod strikes a plug in the spring bottom which triggers in the event of a overstroke. The guide 4 does not necessarily need to project above the gas cylinder 2. In order to prevent triggering of the plug, the protection 10 can also in this case absorb the force and transmit it to the guide 4 and the cylinder wall 5.

A safety method for a gas spring 1 which is described above can comprise applying a compressing axial force to the gas spring 1. When the gas spring 1 approaches overstroke viewed in the direction of compression, a part of the compressing axial force is transmitted to the protection 10, and thereafter that part of the compressing axial force which strikes the protection 10 is transmitted between the guide 4 and the cylinder wall 5. The protection 10 thus relieves the load on the guide 4 and delays triggering of the overstroke protection of the gas spring 1 and reduces the risk of unnecessary triggering thereof.

The safety method can also comprise further steps of, by means of the protection 10, producing an expanding force in the direction opposite to the direction of compression between the guide 4 and the cylinder wall 5, and returning the guide 4 into a starting position when the compressing axial force

The invention claimed is:

1. A safety method for a gas spring comprising a gas cylinder, a piston rod which is movable in the axial direction in the gas cylinder, a guide, an axially outwardly open gap exists between a cylinder wall and the guide, a protection fixed in the guide, in the cylinder wall, or combinations thereof and arranged so that said protection extends radially over a width of the gap, the protection including a base portion and a discontinuous circumferential flange extending downwardly from said base portion, said base portion extending radially over a width of said gap, at least a portion of said base portion extending above an upper end of said gas cylinder, at least a portion of said discontinuous circumferential flange positioned between said guide and said cylindrical wall, said discontinuous circumferential flange spaced from an outer peripheral edge of said base portion, said discontinuous circumferential flange divided in a peripheral direction of said protection to form first and second segments and a first gap section positioned between said first and second segments, a bottom end of said first and second segments is spaced from one another, said bottom end of said first and second segments forming a bottom end of the circumferential flange, a bottom end of said first gap section spaced upwardly from said bottom end of said first and second segments, said protection configured to transmit force to both said guide and said cylinder wall when a downward axially compressing force is applied to said gas spring when said gas spring approaches overstroke viewed in the direction of compression, a length of said first and second segments as measured along an outer perimeter of said discontinuous circumferential flange is at least 1.5 times greater than a length of said first gap section as measured along said outer perimeter of said discontinuous circumferential flange, said protection including a central opening that enables said piston to pass through said protection during movement of said piston in said axial direction in said gas cylinder, said central opening having an inner edge, said discontinuous circumferential flange positioned closer to said inner edge of said central opening than to said outer peripheral edge of said base portion, wherein the safety method comprises:
applying a compressing axial force to the gas spring; and, when the gas spring approaches overstroke viewed in the direction of compression, transmitting a part of the compressing axial force to the protection, and wherein the part of the compressing axial force which strikes the protection is transmitted between the guide and the cylinder wall.

2. The safety method for a gas spring as claimed in claim 1, wherein the safety method comprises further steps of:
producing by means of the protection an expanding force in the direction opposite to the direction of compression between the guide and the cylinder wall; and,
wherein the protection facilitates in returning the guide to a starting position once the compressing axial force has been removed.

3. The safety method for a gas spring as claimed in claim 2, wherein the protection includes a third separated segment and a second gap section that is positioned between the second and third separated segments, said bottom end of said second segment and a bottom end of said third segment is spaced from one another.

4. The safety method for a gas spring as claimed in claim 1, wherein the protection is frictionally fixed with the aid of the circumferential flange in a radial recess in the inner wall surface of the gas cylinder.

5. A gas spring comprising:
a gas cylinder having an upper end and a cavity, said cavity having an inner cylinder wall;
a piston rod which is movable in an axial direction in said cavity of said gas cylinder, said piston rod having a first end that is movable above said upper end of said gas cylinder;
a guide configured to guide said piston rod during movement in said axial direction in said gas cylinder, an upper surface of said guide is positioned above said upper end of said gas cylinder;
a gap, said gap extending axially between said inner cylinder wall and said guide;
a protection, said protection including a base portion and a discontinuous circumferential flange extending downwardly from said base portion, said base portion extending radially over a width of said gap, at least a portion of said base portion extending above said upper end of said gas cylinder, at least a portion of said discontinuous flange positioned between said guide and said inner cylindrical wall, said discontinuous circumferential flange spaced from an outer peripheral edge of said base portion, said circumferential flange divided in a peripheral direction of said protection to form first and second segments and a first gap section that is positioned between said first and second segments, a bottom end of said first and second segments spaced from one another, said bottom end of said first and second segments forming a bottom end of the circumferential flange, a bottom end of said first gap section spaced upwardly from said bottom end of said first and second segments, said protection connected to said guide, said protection configured to transmit force to both said guide and said cylinder wall when a downward axially compressing force is applied to said gas spring when said gas spring approaches overstroke viewed in the direction of compression.

6. The gas spring as defined in claim 5, wherein said base portion of said protection includes a central opening that enables said piston to pass through said protection during movement of said piston in said axial direction in said gas cylinder, said central opening having an inner edge, said discontinuous circumferential flange positioned closer to said inner edge of said central opening than to said outer peripheral edge of said base portion.

7. The gas spring as defined in claim 5, wherein said base portion is positioned above said upper end of said gas cylinder.

8. The gas spring as defined in claim 6, wherein said base portion is positioned above said upper end of said gas cylinder.

9. The gas spring as defined in claim 5, wherein said base portion includes a first outer opening that is configured to allow gas to pass through said first outer opening, said first outer opening spaced from said inner edge of said central opening and said outer peripheral edge of said base portion, said first outer opening spaced from said discontinuous circumferential flange, said first outer opening positioned adjacent to said first gap section.

10. The gas spring as defined in claim 8, wherein said base portion includes a first outer opening that is configured to allow gas to pass through said first outer opening, said first outer opening spaced from said inner edge of said central opening and said outer peripheral edge of said base portion, said first outer opening spaced from said discontinuous circumferential flange, said first outer opening positioned adjacent to said first gap section.

11. The gas spring as defined in claim 5, wherein said protection is formed of a polymer material that can be deformed under a force that is applied axially downward on said protection and then revert back to its original form when the force on said protection is removed.

12. The gas spring as defined in claim 10, wherein said protection is formed of a polymer material that can be deformed under a force that is applied axially downward on said protection and then revert back to its original form when the force on said protection is removed.

13. The gas spring as defined in claim 5, wherein said outer peripheral edge of said base portion of said protection extends to an outer peripheral edge of said gas cylinder.

14. The gas spring as defined in claim 12, wherein said outer peripheral edge of said base portion of said protection extends to an outer peripheral edge of said gas cylinder.

15. The gas spring as defined in claim 5, wherein said protection includes a third separated segment and a second gap section positioned between said second and third separated segments, said bottom end of said first, second, and third segments spaced from one another, a bottom end of said second gap section spaced upwardly from said bottom end of said first, second and third segments.

16. The gas spring as defined in claim 14, wherein said protection includes a third separated segment and a second gap section positioned between said second and third separated segments, said bottom end of said first, second, and third segments spaced from one another, a bottom end of said second gap section spaced upwardly from said bottom end of said first, second, and third segments.

17. The gas spring as defined in claim 5, wherein a length of said first and second segments as measured along an outer perimeter of said discontinuous circumferential flange is at least 1.5 times greater than a length of said first gap section as measured along said outer perimeter of said discontinuous circumferential flange.

18. The gas spring as defined in claim 16, wherein a length of said first and second segments as measured along an outer perimeter of said discontinuous circumferential flange is at least 1.5 times greater than a length of said first gap section as measured along said outer perimeter of said discontinuous circumferential flange.

19. The gas spring as defined in claim 5, wherein said protection is formed in a material having an E-modulus which is at least $\frac{1}{100}$ to $\frac{1}{5}$ of the E-moduli for materials in which said guide and said gas cylinder are formed.

20. The gas spring as defined in claim 18, wherein said protection is formed in a material having an E-modulus which is at least $\frac{1}{100}$ to $\frac{1}{5}$ of the E-moduli for materials in which said guide and said gas cylinder are formed.

21. The gas spring as defined in claim 5, wherein said protection is arranged and configured to transmit an axial force of 1000-50000 N to said guide and a wall of said gas cylinder when the force is applied to said protection.

22. The gas spring as defined in claim 20, wherein said protection is arranged and configured to transmit an axial force of 1000-50000 N to said guide and a wall of said gas cylinder when the force is applied to said protection.

\* \* \* \* \*